United States Patent [19]

Adiletta

[11] Patent Number: 5,981,614
[45] Date of Patent: *Nov. 9, 1999

[54] HYDROPHOBIC-OLEOPHOBIC FLUOROPOLYMER COMPOSITIONS

[76] Inventor: Joseph G. Adiletta, 9 Vernon La., Thompson, Conn. 06277

[ * ] Notice: This patent issued on a continued prosecution application filed under 37 CFR 1.53(d), and is subject to the twenty year patent term provisions of 35 U.S.C. 154(a)(2).

[21] Appl. No.: 08/718,041

[22] Filed: Sep. 13, 1996

[51] Int. Cl.$^6$ ..................................................... C08F 14/06
[52] U.S. Cl. ...................... 521/145; 210/340; 210/510.1; 525/199; 525/200; 95/46; 95/156; 95/241; 95/273
[58] Field of Search ...................................... 525/199, 200; 521/145; 210/348, 510.1; 95/46, 156, 241, 273

[56] References Cited

U.S. PATENT DOCUMENTS

| | | |
|---|---|---|
| 3,489,148 | 1/1970 | Duncan et al. . |
| 3,503,497 | 3/1970 | Riley et al. . |
| 3,644,142 | 2/1972 | Rauch et al. . |
| 3,653,949 | 4/1972 | Dillon . |
| 4,210,697 | 7/1980 | Adiletta . |
| 4,555,543 | 11/1985 | Effenberger et al. . |
| 4,564,552 | 1/1986 | Adiletta . |
| 4,617,057 | 10/1986 | Plueddemann . |
| 4,710,331 | 12/1987 | Nobuo . |
| 4,760,102 | 7/1988 | Moriyama et al. . |
| 4,762,657 | 8/1988 | Rogers et al. . |
| 4,774,001 | 9/1988 | Degen et al. . |
| 4,863,604 | 9/1989 | Lo et al. . |
| 4,865,903 | 9/1989 | Adiletta . |
| 4,868,042 | 9/1989 | Adiletta . |
| 4,880,548 | 11/1989 | Pall et al. . |
| 4,882,113 | 11/1989 | Tu et al. ................................. 525/199 |
| 4,902,456 | 2/1990 | Yen et al. . |
| 4,906,377 | 3/1990 | Yen et al. . |
| 4,990,294 | 2/1991 | Yen et al. . |
| 5,071,609 | 12/1991 | Tu et al. . |
| 5,087,641 | 2/1992 | Sato . |
| 5,098,625 | 3/1992 | Huang et al. . |
| 5,102,921 | 4/1992 | Harada et al. . |
| 5,110,527 | 5/1992 | Harada et al. . |
| 5,116,650 | 5/1992 | Bowser . |
| 5,143,783 | 9/1992 | Shimizu et al. . |
| 5,156,780 | 10/1992 | Kenigsberg et al. . |
| 5,157,058 | 10/1992 | Dillon et al. . |
| 5,188,890 | 2/1993 | Ohashi et al. . |
| 5,190,813 | 3/1993 | Ohashi et al. . |
| 5,200,152 | 4/1993 | Brown . |
| 5,217,666 | 6/1993 | Tamaru et al. . |
| 5,217,802 | 6/1993 | Scarmoutzos . |
| 5,227,230 | 7/1993 | McGlade . |
| 5,234,739 | 8/1993 | Tanaru et al. . |
| 5,234,751 | 8/1993 | Harada et al. . |
| 5,260,360 | 11/1993 | Mrozinski et al. . |
| 5,286,279 | 2/1994 | Wu . |
| 5,286,382 | 2/1994 | Scarmoutzos et al. . |
| 5,342,434 | 8/1994 | Wu . |
| 5,344,580 | 9/1994 | von Werner . |
| 5,352,513 | 10/1994 | Mrozinski et al. . |
| 5,418,006 | 5/1995 | Roth et al. . |
| 5,460,872 | 10/1995 | Wu et al. . |
| 5,466,515 | 11/1995 | Blauer et al. . |
| 5,503,803 | 4/1996 | Brown . |
| 5,506,047 | 4/1996 | Hedrick et al. . |
| 5,539,072 | 7/1996 | Wu . |

FOREIGN PATENT DOCUMENTS

| | | |
|---|---|---|
| 0 612 804 | 8/1994 | European Pat. Off. . |
| 0 632 059 | 1/1995 | European Pat. Off. . |
| 0 650 987 | 5/1995 | European Pat. Off. . |
| 0 700 975 | 3/1996 | European Pat. Off. . |

*Primary Examiner*—John N. Cooney, Jr.
*Attorney, Agent, or Firm*—Leydig, Voit & Mayer, Ltd.

[57] ABSTRACT

The present invention provides a composition comprising a hydrophobic, fluoroplastic polymer and an oleophobic fluoropolymer, wherein said composition is both hydrophobic and oleophobic, and wherein the weight ratio of the hydrophobic, fluoroplastic polymer to the oleophobic fluoropolymer in the composition is at least about 10:1. The present invention also provides products prepared from and using such a composition, as well as methods of preparing such a composition and products.

38 Claims, No Drawings

HYDROPHOBIC-OLEOPHOBIC FLUOROPOLYMER COMPOSITIONS

TECHNICAL FIELD OF THE INVENTION

The present invention relates to hydrophobic and oleophobic fluoropolymer compositions, products prepared from or with such compositions, and methods of preparing such compositions and products. Such compositions can be in the form of liquid dispersions or film or fiber forming compositions, which are useful in a variety of products, particularly filtration media, venting media, liquid repellent laminates, containers, protective clothing, and the like.

BACKGROUND OF THE INVENTION

Fluoropolymers such as polyvinyl fluoride (PVF), polyvinylidene fluoride (PVDF), polytetrafluoroethylene (PTFE), fluorinated ethylene-propylene copolymers (FEP), perfluoro alkoxylated polyfluoroolefins (PFA), and related fluorocarbon and chlorofluorocarbon polymers are good laminate materials because of their heat resistance, chemical inertness, low permeability, and low coefficient of friction over a wide temperature range. The fluorine atoms act as a protective sheath surrounding the carbon—carbon backbone. It is this fluorine sheath which imparts the chemical inertness found in polymeric fluorocarbons. The porosity and permeability of these polymers can be controlled by varying sintering conditions, that is by heating the polymer above its melting point and allowing it to cool down at varying rates (slower cooling yields higher crystallinity as disclosed in U.S. Pat. No. 5,234,751). Likewise, varying the methods by which the thermoplastic resin is stretched will produce lattices of varying porosity.

Fluoropolymers can be homopolymerized in one of two different procedures, yielding either a granular resin or a dispersion. For example, with respect to the homopolymerization of tetrafluoroethylene (TFE), a granular resin can be precipitated out of the reaction solution if little or no dispersing agent is used and if vigorous agitation is maintained, while a colloidal suspension can be obtained from the reaction solution if sufficient emulsifying agent is employed and if only mild agitation is employed to avoid precipitation of the resin.

While the granular resin can be molded into various forms, the resin dispersion can be used to dispersion coat substrates, or it can be converted into a powder. This powder subsequently can be used to form fibers or films, or it can be combined with a lubricant medium and extruded as a paste, which can be formed, stretched, and/or compressed into various forms such as fibers or films (see, e.g., U.S. Pat. No. 5,234,751).

Other fluorocarbons, such as fluorinated ethylene-propylene copolymer (FEP) or perfluoroalkoxy resin (PFA), can be employed in many of the same applications as PTFE. These other compounds share the chemical inertness, heat resistance, and low coefficient of friction of PTFE, and many of these other fluorocarbons have the added advantage of greater thermoplasticity. These other polymers, therefore, can be more easily processed than PTFE.

Because of their inherent chemical, physical, and electrical characteristics, fluorocarbon-based polymers have been utilized extensively as protective coatings, filtration media, and electrical insulation, as well as in water repellent but breathable fabrics. Metallized composite materials containing such fluorocarbon polymers have been employed as thermal control materials (see, e.g., U.S. Pat. No. 5,227,230), electrically conductive materials (see, e.g., U.S. Pat. No. 5,190,813), fire resistant fabrics, and electromagnetic shielding devices.

Fluorocarbon polymers such as PTFE and FEP are particularly well suited for many filtration applications. These fluorocarbon polymers also are used extensively in the chemical industry as a barrier material because they exhibit low permeability to many fluids. The permeability to liquids and gases of such barrier materials can be reduced by increasing the degree of crystallinity of the polymer, thereby decreasing the interstitial spaces of the polymeric lattice.

The benefits of such fluoropolymer products derive in large part from the hydrophobic characteristics of fluoropolymers. In some applications, however, it is desirable to have a product which exhibits oleophobic, in addition to hydrophobic, characteristics. While polymeric products can be rendered oleophobic by a suitable coating of an oleophobic polymer, the application of such a coating to fluoropolymers is difficult as a result of the repellancy characteristics inherent to fluoropolymers. In addition, such an oleophobic coating can have a tendency to mask the hydrophobic properties of the underlying fluoropolymer.

Previous combinations of hydrophobic and oleophobic fluoropolymers, e.g., in aqueous antiwicking compositions (see, e.g., U.S. Pat. No. 4,868,042) have proven useful, but compositions exhibiting improved fluid repellency are desirable. Moreover, it would be desirable if such liquid compositions had an improved ability to penetrate and thereby coat porous, particularly microporous, substrates to render those substrates both hydrophobic and oleophobic. In addition, hydrophobic and oleophobic compositions which can be formed into porous membranes, nonporous films, fibers, and the like would be particularly useful.

Thus, there remains a need for a fluoropolymer composition and products prepared from or using such a composition which possess significant levels of both hydrophobicity and oleophobicity. The present invention provides such a composition and products utilizing the composition. These and other objects and advantages of the present invention, as well as additional inventive features, will be apparent from the description of the invention provided herein.

BRIEF SUMMARY OF THE INVENTION

The present invention provides a composition comprising a hydrophobic, fluoroplastic polymer and an oleophobic fluoropolymer, wherein the composition is both hydrophobic and oleophobic, and wherein the weight ratio of the hydrophobic, fluoroplastic polymer to the oleophobic fluoropolymer is at least about 10:1. The present invention also provides products comprising the present inventive composition, which products exhibit both hydrophobic and oleophobic characteristics. Such products include nonporous films, porous membranes, fibers, and composites comprising these products.

DETAILED DESCRIPTION OF THE PREFERRED EMBODIMENTS

The present invention is predicated, at least in part, on the discovery that intermixing a suitable hydrophobic fluoropolymer (preferably a dispersion thereof) with a suitable oleophobic fluoropolymer (also preferably a dispersion thereof) results in a composition which is both hydrophobic and oleophobic and can be used to prepare a suitable product or applied to a suitable substrate to impart both hydrophobic and oleophobic properties to the product or substrate. Accordingly, the present invention provides such a composition, which comprises a hydrophobic, fluoroplastic polymer and an oleophobic fluoropolymer, as well as products prepared from or using such a composition, and methods of preparing such a composition and products.

The novel formulation of the present inventive composition results in an unexpected, synergistic combination of the fluoroplastic's hydrophobicity (and, with certain preferred polymers, structural resiliency, ductility, and porosity) and the other fluoropolymer's oleophobicity (and, with certain preferred polymers, detergent resistance and solvent repellency). These characteristics make the present inventive composition suitable for use with, and an effective barrier against, a much wider array of fluids than compositions containing either of the two components alone.

Composition

Any suitable hydrophobic, fluoroplastic polymer or combination of such polymers can be utilized in the context of the present invention. Preferably, the fluoroplastic polymer is a thermoplastic polyfluoroolefin compound. Most preferably, the fluoroplastic polymer is a thermoplastic polyfluoroolefin selected from the group consisting of polytetrafluoroethylene (PTFE), fluorinated ethylene-propylene copolymer (FEP), perfluoroalkoxy resin (PFA), polychlorotrifluoroethylene (PCTFE), ethylene-chlorotrifluoroethylene copolymer (ECTFE), ethylene-tetrafluoroethylene copolymer (EPTFE), polyvinylidene fluoride (PVDF), and polyvinyl fluoride (PVF).

Any suitable oleophobic fluoropolymer can be utilized in the context of the present invention. Such oleophobic fluorochemicals include polymeric fluoroaliphatic esters such as 3M's FC824®, as well as fluoroalkyl polymers such as 3M's FX845®, ICI's Milease F53®, ICI's F31X®, and Daiken's UNIDYNE®.

The present inventive composition preferably is a dispersion of the hydrophobic, fluoroplastic polymer and the oleophobic fluoropolymer, more preferably an aqueous dispersion thereof, which, when formed into a product or used to coat a substrate and when dry, exhibits both hydrophobic and oleophobic characteristics. Alternatively, the present inventive composition can take the form of a film or fiber forming composition (e.g., a blend of the hydrophobic, fluoroplastic polymer and the oleophobic fluoropolymer). Such a composition can be formed into a porous membrane, nonporous film, or fiber, which can be laminated onto or woven into suitable substrates to impart hydrophobicity and oleophobicity.

The hydrophobicity (water repellency) and oleophobicity (oil repellency) of the present inventive composition and the products prepared from or using the present inventive composition can be determined by a number of techniques. The hydrophobicity and oleophobicity of the present inventive composition have reference to the composition in a dry form (and preferably in a flat form for testing purposes), as opposed to a liquid form, such as when the present inventive composition is in the form of a dispersion (which can be tested after a product is formed from the dispersion and the carrier liquid is evaporated).

Hydrophobicity in the context of the present invention can be described in terms of the resistance to liquid penetration. A sample of a product prepared from or using the present inventive composition (preferably a 47 mm diameter sample thereof) is clamped into a filter holder with an open face. The upstream side of the sample is subjected to a liquid, and the applied pressure which causes liquid to start to penetrate (e.g., weep or bead) through the sample is noted as the repellency value. A product of the present invention desirably has a water repellency value of about 10 kPa (about 1.5 psi) or more, preferably about 15 kPa (about 2.2 psi) or more, more preferably about 20 kPa (about 2.9 psi) or more, and most preferably about 30 kPa (about 4.4 psi) or more. Some products of the present invention have a water repellency value of about 70 kPa (about 10.2 psi) or more, or even about 100 kPa (about 14.5 psi) or more. Similarly, a product of the present invention preferably has a detergent repellency value, using a 25% solution of TWEEN 20®, of about 7 kPa (about 1 psi) or more, more preferably about 8 kPa (about 1.2 psi) or more, and most preferably about 10 kPa (about 1.5 psi) or more.

Hydrophobicity in the context of the present invention also can be described in terms of the critical wetting surface tension (CWST). CWST is described in detail in U.S. Pat. No. 4,880,548. The CWST of a medium is defined as that which is equal to the average of the surface tensions of two liquids of which one is absorbed when a drop of the liquid is applied to the surface of the medium, while a drop of slightly higher surface tension liquid, for example two mN/m (about two dynes/cm) higher, will not be absorbed. A product of the present invention preferably has a CWST of about 70 mN/m (about 70 dynes/cm) or less, more preferably about 60 mN/m (about 50 dynes/cm) or less, and most preferably about 50 mN/m (about 50 dynes/cm) or less.

Oleophobicity in the context of the present invention can be described in terms of the resistance to liquid penetration in the same manner as described above for hydrophobicity, except using liquids other than water. For example, a product of the present invention preferably has a mineral oil repellency value of about 7 kPa (about 1 psi) or more, more preferably about 8 kPa (about 1.2 psi) or more, and most preferably about 10 kPa (about 1.5 psi) or more, within a time frame of 5 minutes or more (in some embodiments as long as 45 minutes or more). Some products of the present invention have a mineral oil repellency value of about 50 kPa (about 7.3 psi) or more, or even about 70 kPa (about 10.2 psi) or more. Similarly, a product of the present invention preferably has an isopropyl alcohol (70% conc.) repellency value of about 2 kPa (about 0.3 psi) or more, more preferably about 4 kPa (about 0.6 psi) or more, and most preferably about 5 kPa (about 0.7 psi) or more.

Oleophobicity in the context of the present invention also can be described in terms of a drop of mineral oil or another suitable aliphatic liquid not being able to wet the surface of a product of the present invention when such a drop is placed in contact with the product. A product of the present invention preferably is so oleophobic that a drop of mineral oil does not wet the surface of the product.

The hydrophobic, fluoroplastic polymer and the oleophobic fluoropolymer can be present in the present inventive composition in any suitable amounts. It is desirable that the weight ratio of hydrophobic, fluoroplastic polymer to oleophobic fluoropolymer be at least about 10:1 (e.g., about 10:1 to about 30:1). Particularly desirable weight ratios of the hydrophobic and oleophobic compounds in the present inventive composition are from about 10:1 (hydrophobic:oleophobic) to about 15:1 (hydrophobic:oleophobic). For some applications it may be desirable to have weight ratios in the range or 15:1 to 30:1. The optimum weight ratio of the present inventive composition, particularly as applied to a substrate, can be influenced by the particular hydrophobic, fluoroplastic polymer and oleophobic fluoropolymer, the intended end use of the ultimate product, and the physical properties of the substrate, e.g., the basis weight and porosity of the substrate. For example, desirable embodiments of the present invention include (a) a porous web having a basis weight of about 38 g/m$^2$ (about 1.1 oz/yd$^2$) and a pore rating of about 3 $\mu$m, which is coated with a 30 wt. % hydrophobic, fluoroplastic polymer/2 wt. % oleophobic fluoropolymer solution, thereby yielding a coated substrate with a water repellency value of about 14 kPa (about 2 psi) and a mineral oil repellency value of about 7 kPa (about 1 psi), and (b) a porous web having a basis weight of about 43 g/m$^2$ (about 1.3 oz/yd$^2$) and a pore rating of about 0.1 $\mu$m, which is coated with a 15 wt. % hydrophobic, fluoroplastic polymer/ 1.5 wt. % oleophobic fluoropolymer solution, thereby yielding a coated substrate with a water repellency value of about 100 kPa (about 15 psi) and a mineral oil repellency value of about 50–60 kPa (about 7–9 psi).

The present inventive composition can contain other suitable components, particularly those which do not adversely affect the hydrophobic and oleophobic properties of the present inventive composition. When other components are present in the present inventive composition, particularly a carrier liquid such as when the present inventive composition is in the form of a liquid dispersion, the hydrophobic, fluoroplastic polymer preferably is present in an amount of about 5–75% by weight of the total composition, more preferably in an amount of about 20–50% by weight of the total composition. Preferably, the oleophobic fluoropolymer is present in an amount of about 0.1–10% by weight of the total composition, more preferably in an amount of about 3–5% by weight of the total composition. Optimally, the oleophobic fluorochemical is present in an amount of about 5% by weight of the total composition.

The present inventive composition typically will be cured and sintered to form a useful product. It is particularly surprising that the present inventive composition can be suitably cured and sintered without the loss of hydrophobic and oleophobic characteristics. In particular, the sintering temperatures of many hydrophobic, fluoroplastic polymers (particularly hydrophobic, thermoplastic polyfluoroolefins) are much higher than the curing temperatures of many oleophobic fluoropolymers. For example, the sintering temperature of the hydrophobic, thermoplastic polyolefin TFE is over about 340° C. (about 650° F.), and generally in the range of about 370–480° C. (about 700–900° F.), while the curing temperature of many oleophobic fluoropolymers can be much lower, such as below about 150° C. (about 300° F.), e.g., generally in the range of about 120–150° C. (about 250–300° F.).

When the present inventive composition is subjected to sufficiently high temperatures to sinter the hydrophobic, fluoroplastic polymer, the oleophobic fluoropolymer is not lost e.g., through evaporation, degradation, or the like, because of the relatively short time needed for sintering at the high temperature. Potential processing difficulties can be overcome by carefully controlling the temperatures to which the present inventive composition are exposed and the duration of such exposures. Thus, for example, when utilizing a FEP formulation, after coating a substrate with the present inventive composition to form a composite, the composite can be satisfactorily cured by drying at about 90–150° C. (about 200–300° F.) for 3 minutes, followed by heating at about 130–190° C. (about 300–400° F.) for 3 minutes, and sintering for 1–2 minutes at about 270° C. (about 550° F.). If a PTFE formulation is utilized, the latter temperature range can be about 370–400° C. (about 700–750° F.). While the aforementioned curing and sintering steps can be performed on the present inventive composition alone (e.g., when preparing a product directly from the present inventive composition, which subsequently can be laminated to a suitable substrate to form a composite), these steps also can be performed in-situ on a suitable substrate to form a composite.

Dispersion

When the present inventive composition is in the form of a dispersion, the hydrophobic, fluoroplastic polymer and the oleophobic fluoropolymer are combined with and dispersed in a suitable carrier liquid. Such a dispersion, in addition to the hydrophobic, fluoroplastic polymer, the oleophobic fluoropolymer, and the carrier liquid, can include suitable surfactants or emulsifiers, as well as suitable wetting agents, to facilitate the use of the dispersion, e.g., to coat a substrate. Moreover, the dispersion can include suitable antioxidants, flame retardants, and pigments. Most preferably, when the present inventive composition is a dispersion, the present inventive composition does not contain any component other than the hydrophobic, fluoroplastic polymer and the oleophobic fluoropolymer, other than a carrier liquid and possibly a surfactant and/or wetting agent.

A particularly preferred embodiment of the present inventive composition comprises a 15–20 wt. % aqueous dispersion of 260° C. (500° F.) cure fluorinated ethylene-propylene copolymer in combination with an aqueous dispersion of 2 wt. % 150° C. (300° F.) cure 3M fluoroalkyl polymer FX845®, and additional surfactants such as 0.1 wt. % sodium lauryl sulfate or sodium dodecyl sulfate.

Film or Fiber Forming Composition

When the present inventive composition is in the form of a film or fiber forming composition, the hydrophobic, fluoroplastic polymer and the oleophobic fluoropolymer can be present in the absence of other components; however, other additives desirably are present in the composition. Particularly desirable additives include those additives selected from the group consisting of extenders, fillers, antioxidants, flame retardants, stabilizers, pigments, and combinations thereof.

Suitable extenders include SUS Chemical Co.'s FREEPEL 93® or USCOPEL K154®. Suitable fillers include clay, mica, calcium carbonate, and the like. Suitable flame retardants include phosphoric esters such as triphenyl phosphate, tricresyl phosphate, boric acid, and the like. Suitable stabilizers include sterically hindered phenols, organic phosphites, oxalic acid diazides, sterically hindered amines, and the like. Suitable pigments include iron oxide, titanium dioxide, zinc sulfide, and the like.

These other components of the present inventive composition can be present in any suitable amount. When present, these other components of the present inventive composition preferably are present in an amount of about 45% or less by weight of the total composition, more preferably about 30% or less by weight of the total composition, and most preferably about 10% or less by weight of the total composition.

Product

Any suitable product can be prepared from or using the present inventive composition. In particular, those products conventionally prepared from or using hydrophobic, fluoroplastic polymers alone can be prepared from or using the present inventive composition. Such products can retain the gas permeability of conventional membranes and films characteristic of the use of the hydrophobic, fluoroplastic polymers (particularly hydrophobic, thermoplastic polyfluoroolefins) alone, while imparting to the products oleophobicity not present in the conventional products. Suitable products in accordance with the present invention include porous membranes, nonporous films, and fibrous media (such as knit, woven, and nonwoven media), as well as composites which include a product prepared from or using the present inventive composition, such as coated and laminated substrates.

A product in accordance with the present invention can be prepared in any suitable manner, such as those conventionally used to prepare products from or using the hydrophobic, fluoroplastic polymer alone. In that respect, the permeability of such products to liquids and gases can be varied by altering the curing temperatures, sintering methods, mechanical manipulations (e.g., stretching), and percentages of the components. Suitable manufacturing techniques are disclosed in, for example, U.S. Pat. Nos. 3,503,497, 4,210,697, 4,564,552, 4,865,903, 5,234,739, and 5,234,751. The present inventive composition desirably can be used in accordance with conventional techniques to directly form porous membranes, nonporous films, fibers, and the like, as well as a wide variety of composites.

Coated Substrate

Any suitable substrate can be coated (e.g., dispersion coated) with the present inventive composition (e.g., in the form of a dispersion). Suitable substrates include porous membranes, nonporous films, and fibrous media (e.g., knit, woven, and nonwoven fibrous webs).

A substrate can be coated with the present inventive composition in any suitable manner. Suitable application techniques include spray coating the substrate, dip coating the substrate, passing the substrate through kissing rolls, and spreading onto or coating the substrate from a head box, optionally with the aid of a doctor blade. Preferably, a substrate is spray coated or dip coated with the present inventive composition in the form of a dispersion, which ideally contains a surfactant such as sodium lauryl sulfate or sodium dodecyl sulfate, so as to facilitate coverage of the present inventive composition over the entire surface of the substrate, e.g., to ensure more complete penetration into the pores of a porous substrate.

After application to the substrate, the present inventive composition desirably is cured and sintered on the substrate, thereby forming a composite. Alternatively, the present inventive composition can be heated to a sufficiently high temperature (e.g., above the melting point of the hydrophobic, fluoroplastic polymer) and applied to the substrate so as to effect curing and sintering of the present inventive composition on the substrate. Any suitable curing and sintering technique can be utilized in the context of the present invention. Suitable methods of coating a substrate with a dispersion and subsequently sinter bonding the coating to the substrate are described in U.S. Pat. No. 4,210,697.

Since the coating desirably is cured and sintered on the substrate, the substrate preferably is capable of withstanding the elevated temperature needed to effect such curing and sintering of the present inventive composition. Suitable high temperature compatible substrates include fibrous webs prepared from glass fibers, aramid fibers, nomex fibers, ceramic fibers, metal fibers, and alumina fibers.

With respect to a fibrous substrate, the fibers which form the fibrous substrate can be coated before or after formation into the fibrous substrate. Thus, a slurry can be prepared comprising both fibers and the present inventive composition, which slurry then can be formed into a fibrous substrate, e.g., a sheet-like material, by any suitable technique, such as by conventional Fourdrinier paper making techniques.

As an illustration of the preparation of a coated substrate in accordance with the present invention, a venting filter for sterilization or for a urine collection bag can be prepared as follows: A 15–20 wt. % aqueous dispersion of a 260° C. (500° F.) cure fluorinated ethylene-propylene copolymer is mixed with a 2 wt. % aqueous dispersion of 150° C. (300° F.) cure 3M fluoroalkyl polymer FX845®. A porous substrate such as an aramid fiber web is then coated with the dispersion by dipping or spray application. The resulting composite is cured by drying at about 90–150° C. (about 200–300° F.) for 3 minutes, following by heating at about 130–190° C. (about 300–400° F.) for 3 minutes, and sintering for 1–2 minutes at about 270° C. (about 550° F.).

In addition to conferring the desirable fluid repellency to a fibrous substrate, the composition (specifically the fluoroplastic polymer component thereof) binds the substrate fibers together and provides added strength to the substrate and prevents substrate fiber shedding. Such binding is the result of the fact that the thermoplastic fluoropolymer of the present inventive composition flows when heated and is fusible so as to allow for melt bonding to the fibrous substrate.

Laminated Substrates

Any suitable substrate can be laminated to a product prepared from or with the present inventive composition (e.g., in the form of a porous membrane, nonporous film, or fibrous medium). Suitable substrates include porous membranes, nonporous films, and fibrous media (e.g., knit, woven, and nonwoven fibrous webs). Generally, a wider range of substrates can be used to prepare laminated substrates than can be used to prepare coated substrates inasmuch as the entire substrate need not be subjected to the temperatures necessary to effect curing and sintering of the present inventive composition, as can be the situation with coated substrates (wherein, for example, the curing and sintering of the present inventive composition which coats the substrate are performed in situ on the substrate).

A substrate can be laminated to a product prepared from or with the present inventive composition in any suitable manner. Suitable methods of laminating a substrate with another product are described in U.S. Pat. No. 4,865,903. For example, a product (e.g., a cast film) of the present inventive composition can be affixed onto the surface of a substrate by heating the product to its softening temperature and then contacting the product with the substrate. Binding is effected as the result of the hydrophobic, fluoroplastic polymer of the present inventive composition flowing when heated to a sufficiently high temperature and being fusible so as to allow for melt bonding of the product to the substrate. If desirable, the product of the present inventive composition can be mated with the substrate, and the entire composite heated to a sufficiently high temperature to effect melt bonding of the product and substrate. In addition, binding can be effected as between a product of the present inventive composition and a substrate by way of a suitable adhesive, preferably a thermoplastic polymer, more preferably a thermoplastic fluoropolymer having a lower melting temperature than the hydrophobic, fluoroplastic polymer of the present inventive composition, which can effect melt bonding between the product of the present inventive composition and the substrate. Moreover, fibers can be bound to a product prepared from or using the present inventive composition by melt blowing such fibers directly onto such a product, as is generally described in U.S. Pat. No. 4,774,001.

As an illustration of the preparation of a laminated substrate in accordance with the present invention, a protective garment can be prepared as follows: A 0.02–6 mm (preferably 0.02–2 mm) thick, flexible, permeable, cast film is prepared from the present inventive composition. The cast film is liquid repellent (both hydrophobic and oleophobic), yet is gas permeable. The thickness and weight of the cast film will vary depending on the wear and chemical exposure which the material is expected to withstand. In general, the thinnest possible film, consistent with the formation of an effective barrier, should be used, as this contributes to a lighter, more flexible garment, and one in which the thermal bonding of the film with the substrate can be accomplished more effectively.

The cast film is laminated onto a fabric substrate which can be made into a protective garment to be used by, for example, health care workers. The fabric substrate can comprise any knit, woven, or non-woven fabric material which is generally suitable for use as clothing and which presents a reasonably flat contact area for bonding. Such a fabric substrate also should be dimensionally stable and otherwise capable of withstanding the temperatures encountered in thermal-melt bonding the coated film to the fabric substrate. Those temperatures will vary according to the coated film, but in general will be higher than about 270° C. (550° F.). Accordingly, such a fabric substrate preferably is composed of natural and synthetic fibers such as those prepared from metal, polyimide, aramid, carbon, glass, ceramic, graphite, potassium titanate, and blends thereof. In general, the fabric substrate will have a thickness of about 0.025–0.5 cm (about 0.01–0.2 inch), preferably about 0.1–0.2 cm (about 0.05–0.08 inch), and a basis weight of about 68–340 g/m$^2$ (about 2–10 oz/yd$^2$), preferably about 102–136 g/m$^2$ (about 3–4 oz/yd$^2$).

Woven fabrics are preferred as substrates because of their relative strength and flexibility as compared to non-woven fabrics. Puncture and tear resistant fabrics are particularly preferred. Due to the relatively high cost of woven fabrics, less expensive spun-laced fabrics such as polyaramid blend fabrics (particularly a blend of DuPont Nomex and Kevlar fibers), which can provide adequate strength and flexibility while providing a suitable bonding surface, also are preferred as substrates for laminated substrates in accordance with the present invention.

Applications

The products of the present invention can be used in, or adapted for use in, any suitable application. Such applications include, but are not limited to, applications in which conventional fluoroplastic polymer compositions and products are utilized, as well as a wide variety of other applications.

For example, the coated and laminated substrates of the present invention can be used as filtration devices, articles of clothing, venting media, and the like. Fibers prepared from the present inventive composition can be woven into protective garments which are effective against toxic chemicals and/or biological fluids. The present inventive composition can be used to provide antiwetting surfaces for bags and other containers, particularly those used to contain toxic or biohazardous waste, as well as those for expensive fluids (e.g., genetic fluids) so as to minimize fluid permeation and consequent loss of material and to enable more complete emptying of the bag or container. In addition, the present inventive composition can be employed in a fluid impermeable layer for a variety of surfaces including external and internal building surfaces, lab benches, table tops, cooking utensils, and toilet fixtures. Any desired degree of porosity and permeability can be attained by varying sintering conditions or by other mechanical manipulations, as are known in the art. Thus, it may be desirable to produce a liquid and gas impermeable laminate for lab benches, cooking utensils, and toilet fixtures, or a fluid resistant, and a liquid impermeable but gas permeable laminate for external building sidings and clothing.

In view of the presence of the melt bonding characteristics of the hydrophobic, fluoroplastic polymer in the products of the present invention, such products can be joined without stitches. Where increased strength is required and sewn seams preferably are used, the sewn seams of the product can be thermally treated to melt bond the seam area so as to allow the hydrophobic, fluoroplastic polymer to flow into seam holes, fill them, and thereby protect the integrity of the seam.

Many products prepared from or using hydrophobic, fluoroplastic polymers, particularly PTFE, cannot be radiation sterilized because of undesirable shearing or crosslinking occurring during the course of being irradiated. The present composition, however, desirably is resistant to radiation (i.e., not significantly adversely affected thereby), thereby allowing products prepared from or using the present inventive composition to be radiation sterilized. This characteristic is particularly useful in the medical arts, where products are desirably sterilized in this fashion.

All of the references cited herein, including patents, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A composition comprising a hydrophobic, thermoplastic polyfluoroolefin and a non-elastomeric oleophobic fluoropolymer, wherein said composition is both hydrophobic and oleophobic.

2. The composition of claim 1, wherein the weight ratio of hydrophobic polyfluoroolefin to oleophobic fluoropolymer in the composition is in the range of about 10:1 to about 30:1.

3. The composition of claim 1, wherein the weight ratio of hydrophobic polyfluoroolefin to oleophobic fluoropolymer in the composition is in the range of about 15:1 to about 30:1.

4. The composition of claim 1, wherein said hydrophobic polyfluoroolefin is selected from the group consisting of polytetrafluoroethylene, fluorinated ethylene-propylene copolymer, perfluoroalkoxy resin, polychlorotrifluoroethylene, ethylene-chlorotrifluoroethylene copolymer, ethylene-tetrafluoroethylene copolymer, polyvinylidene fluoride, polyvinyl fluoride, and combinations thereof.

5. The composition of claim 4, wherein said oleophobic fluoropolymer is selected from the group consisting of polymeric fluoroaliphatic esters, fluoroalkyl polymers, and combinations thereof.

6. The composition of claim 4, wherein said oleophobic fluoropolymer is a fluoroalkyl polymer.

7. The composition of claim 1, wherein said composition further comprises an additive selected from the group consisting of carriers, emulsifiers, surfactants, wetting agents, extenders, fillers, antioxidants, flame retardants, stabilizers, pigments, and combinations thereof.

8. The composition of claim 7, wherein said composition further comprises a surfactant or wetting agent, and the surfactant or wetting agent is selected from the group consisting of sodium lauryl sulfate and sodium dodecyl sulfate.

9. The composition of claim 7, wherein said additive is present in an amount of about 60% or less by weight of the total composition.

10. The composition of claim 7, wherein said additive is present in an amount of about 30% or less by weight of the total composition.

11. The composition of claim 7, wherein said hydrophobic thermoplastic polyfluoroolefin is present in an amount of about 5–75% by weight of the total composition.

12. The composition of claim 11, wherein said oleophobic fluoropolymer is present in an amount of about 0.1–10% by weight of the total composition.

13. The composition of claim 12, which further comprises a carrier liquid and which is in the form of a dispersion.

14. A film or fiber forming composition comprising a hydrophobic, thermoplastic polyfluoroolefin and a non-elastomeric oleophobic fluoropolymer, wherein said composition is both hydrophobic and oleophobic.

15. The composition of claim 14, wherein said hydrophobic polyfluoroolefin is selected from the group consisting of polytetrafluoroethylene, fluorinated ethylene-propylene copolymer, perfluoroalkoxy resin, polychlorotrifluoroethylene, ethylene-chlorotrifluoroethylene copolymer, ethylene-tetrafluoroethylene copolymer, polyvinylidene fluoride, polyvinyl fluoride, and combinations thereof; and wherein said oleophobic fluoropolymer is selected from the group consisting of polymeric fluoroaliphatic esters, fluoroalkyl polymers, and combinations thereof.

16. A porous membrane comprising the composition of claim 15.

17. A nonporous film comprising the composition of claim 15.

18. A fiber comprising the composition of claim 15.

19. A composite comprising a substrate laminated with the porous membrane of claim 16.

20. A composite comprising a substrate laminated with the nonporous film of claim 17.

21. A composite comprising a substrate and the fiber of claim 18.

22. A composite comprising a substrate coated with the composition of claim 1.

23. The composite of claim 22, wherein said composite is porous.

24. The composite of claim 23, wherein said substrate is a fibrous substrate.

25. The composite of claim 22, wherein said composite is nonporous.

26. A filtration device comprising a housing and the membrane of claim 16.

27. A filtration device comprising a housing and the composite of claim 23.

28. An article of clothing comprising the composite of claim 19.

29. An article of clothing comprising the composite of claim 20.

30. An article of clothing comprising the composite of claim 21.

31. An article of clothing comprising the composite of claim 22.

32. A venting medium comprising the membrane of claim 16.

33. A venting medium comprising the composite of claim 19.

34. A venting medium comprising the composite of claim 23.

35. A method for treating a fluid comprising gas and liquid comprising:
   contacting a porous membrane comprising the composition of claim 14 with said fluid, wherein said membrane substantially permits the gas to pass through the membrane and wherein said membrane substantially precludes the liquid from passing through the membrane.

36. A method for venting gas comprising:
   contacting a porous membrane comprising the composition of claim 14 with gas and liquid, said porous membrane including a first surface and a second surface, wherein said membrane substantially permits the gas to pass through the membrane, and wherein said membrane substantially precludes the liquid from passing through the membrane.

37. The method of claim 36, wherein the gas passes from the first surface to the second surface, and wherein liquid is precluded from passing from the second surface to the first surface.

38. The method of claim 36, wherein the gas passes from the first surface to the second surface, and wherein liquid is precluded from passing from the first surface to the second surface.

* * * * *